No. 740,442. Patented October 6, 1903.

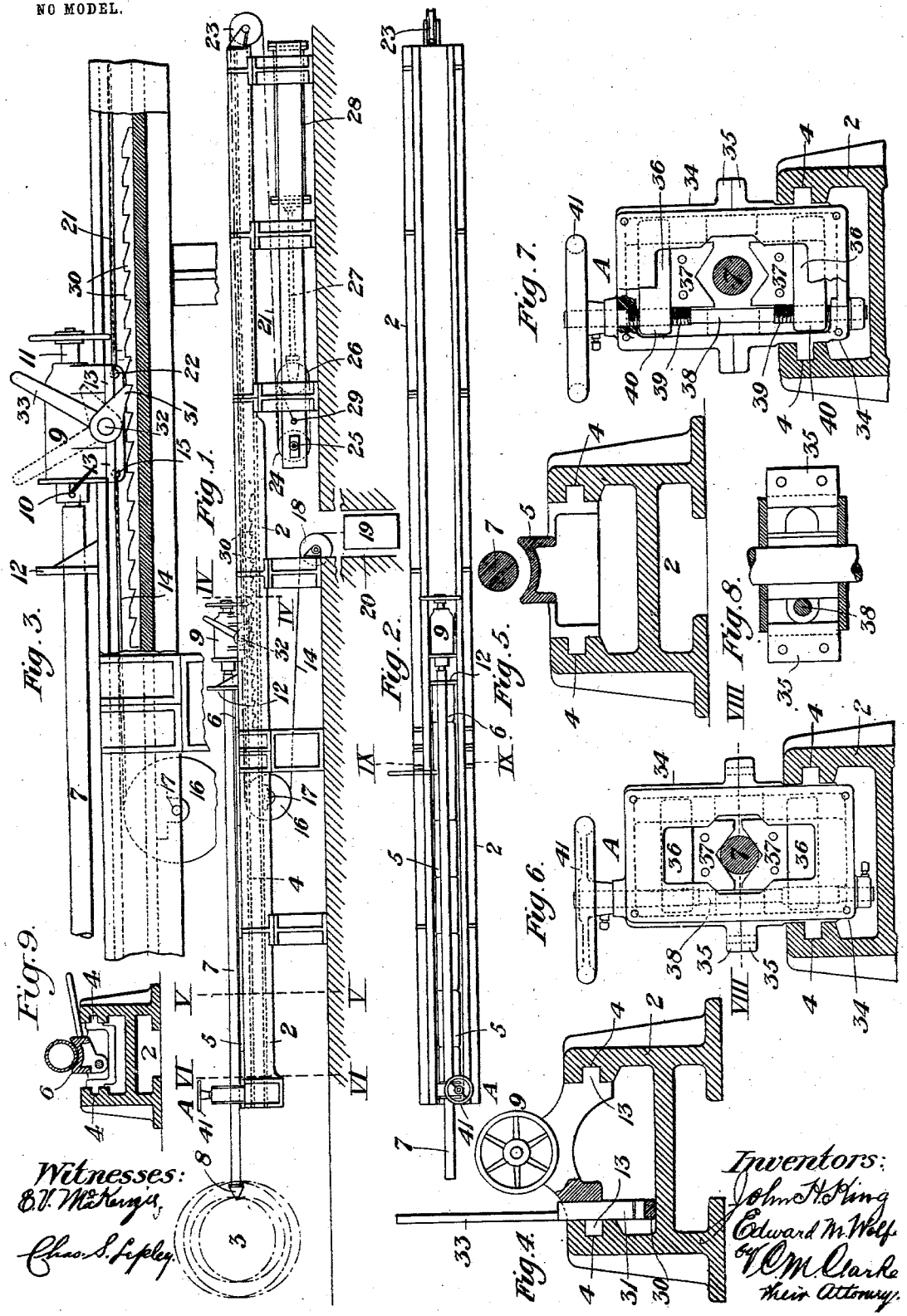

UNITED STATES PATENT OFFICE.

JOHN H. KING AND EDWARD M. WOLFE, OF BEAVERFALLS, PENNSYLVANIA, ASSIGNORS OF ONE-THIRD TO GEORGE H. BLAXTER, OF PITTSBURG, PENNSYLVANIA.

APPARATUS FOR MANUFACTURING SEAMLESS TUBING.

SPECIFICATION forming part of Letters Patent No. 740,442, dated October 6, 1903.

Application filed December 26, 1901. Serial No. 87,363. (No model.)

*To all whom it may concern:*

Be it known that we, JOHN H. KING and EDWARD M. WOLFE, citizens of the United States, residing at Beaverfalls, in the county of Beaver and State of Pennsylvania, have invented certain new and useful Improvements in Apparatus for Manufacturing Seamless Tubing, of which the following is a specification, reference being had therein to the accompanying drawings, forming part of this specification, in which—

Figure 1 is a view in side elevation of our improved apparatus for manufacturing tubes, showing the bar advanced. Fig. 2 is a plan view of Fig. 1. Fig. 3 is a partial view, in side elevation, partly broken away, showing the cable connections for operating the thrust-bearing. Fig. 4 is a cross-sectional view on the line IV IV of Fig. 1. Fig. 5 is a similar view on the line V V of Fig. 1. Fig. 6 is a similar view on the line VI VI of Fig. 1. Fig. 7 is a view similar to Fig. 6, but showing the jaws separated. Fig. 8 is a cross-sectional view on the line VIII VIII of Fig. 6. Fig. 9 is a vertical sectional view on the line IX IX of Fig. 2.

Our invention relates to the manufacture of seamless tubes; and it consists in the means for advancing and withdrawing the bar carrying the piercing-point over which the tube is formed, means for stripping the finished tube, disengaging it from the table, and for the centering, supporting, adjustment, and location of the bar, together with other details of construction, as shall be more fully hereinafter set forth.

Referring to the drawings, 2 is a longitudinal frame or table situate in advance of the disks 3 or other suitable blank-forming mechanism, such table or frame being provided upon its inner faces with slideways 4, extending, preferably, from one end to the other of the table. In such slideways is mounted the permanent trough 5, adapted to receive the tube after the bar is withdrawn, while beyond such fixed trough is a tipping section of trough 6, pivotally mounted upon suitable supports, by which the finished tube may be thrown to one side and discharged from the table upon skids or other suitable supporting apparatus. This construction is shown more fully in Fig. 9.

7 is the usual mandrel, upon the outer end of which is placed the piercing-point 8, the bar being connected at its rear end, as shown, with the traveling adjustable thrust-bearing 9. The connection of the bar with the thrust-bearing is flexible by reason of a pin passing through the mandrel and the slotted connection 10, as shown, whereby it may move freely in any direction and may be adjusted forwardly by the adjusting-screw 11 to the exact position desired with relation to the working faces of the disks.

Immediately in advance of the thrust-bearing is an abutment 12, through an opening in which the mandrel passes, but which abutment, however, limits the back travel of the tube and strips it off the mandrel during its back progress. The thrust-bearing 9 is mounted, by means of slides 13, in the slideways 4, in which it is free to travel forward and back, and such travel is imparted to it through cables connected to the center frame of the thrust-bearing, as shown in Figs. 1 and 3. The cable 14 is attached at 15, passes forwardly around a grooved wheel 16, mounted in bearings 17 upon the under portion of the table, the cable then passing back over a grooved sheave-wheel 18, also pivotally mounted in suitable bearings, the other end of the cable being attached to a counterweight 19, adapted to rise and fall in a pit 20 and at all times maintaining a tension and forward pull upon the thrust-bearing. Backward travel of the thrust-bearing is caused by means of cable 21, similarly connected at 22 to the thrust-bearing, the cable passing backwardly around sheave-wheel 23, mounted at the outer end of the frame, then forwardly around a similar wheel 24, pivotally mounted in bearings 25 underneath the table, then around a traveling pulley-wheel 26, carried upon the outer end of a piston-rod 27 of a fluid-actuated cylinder 28. Several of such wheels 24 and 26 may be provided, and the cable may be passed one or more times around such wheels 24 and 26 and then secured to any suitable point in the frame, as at 29. By passing the cable as many times as desired around these wheels it will be seen that the leverage upon the thrust-bearing may be multiplied two or more times, according to the work in view. The cylinder 28 is preferably double-acting to assist the counterweight and may be operated by a valve located at any convenient point to admit pressure to cause outward travel of the sheave-wheels 26 and similar movement of the thrust-bearing 9, the return movement being accomplished by means of the weight 19 and cable 14.

Mounted upon the sides of the table on one side in any convenient position is a rack-bar provided with teeth 30, into which the pawl 31 will engage at any desired position, so as to lock the thrust-bearing in order to maintain the point 8 against pressure of the oncoming blank. The pawl 31 is pivotally mounted upon the side of the thrust-bearing at 32, and connected with it is an upwardly-extending lever-arm 33, by which it may be thrown out of engagement, and when so thrown out of engagement, as indicated in dotted lines in Fig. 3, the weight of the lever will hold the pawl out of engagement with the teeth of the rack-bar to permit backward travel of the thrust-bearing.

The range of adjustment of the screw 11 being somewhat greater than the pitch of teeth 30, it will be seen that the bar can be set independent of the pitch of the teeth and that having been so arranged it is only necessary to bring the thrust-bearing forward to its proper position and then throw the pawl 31 into engagement and apply sufficient back pressure to it in order to maintain the point in proper position for work.

Mounted upon the table 2 at its forward end immediately in advance of the disks 3 is a supporting and centering device A consisting of a frame 34, the lower portion of which is mounted in the slideways 4 of the table and secured therein by any suitable devices, as set-screws. The upper and lower portions of the frame are rigidly secured together by flanges 35, and slidingly mounted in vertical ways or guides in the interior of the frame are upper and lower jaw holders 36, to which are secured corresponding upper and lower jaws 37, the inner faces of which are made V-shaped, so as to embrace the bar 9 when the jaws are brought together, as indicated in Fig. 6. The bearing-faces of these jaws are also preferably hardened, so as to prevent wear. Rotatably mounted in one side of the frame, extending from the top to the bottom, is a stem 38, the upper and lower portions of which are threaded, as shown at 39, in opposite directions, which threaded portions pass through laterally-extending lugs 40 of the jaw-holders and by which construction upon rotation of the stem 38 the jaw-holders and jaws are brought together or are separated, as shown in Fig. 7. The upper end of the stem is provided with a hand-wheel 41, by which it is rotated, and such adjustment is capable of being made very quickly. When the mandrel is in its advanced position, as shown in Fig. 1, the jaws embrace and hold it in central alinement during the first portion of the piercing operation, after which the jaws are opened sufficiently far to permit the oncoming hollow billet to pass between them without interference until it is forced entirely forward over the mandrel. The pawl 31 is then thrown up, pressure is supplied to cylinder 28, and the mandrel is withdrawn to its full limit, during which backward movement the tube comes into contact with the abutment 12, first stripping off the piercing-point against the outer end of the tube and then stripping the tube itself against the abutment until it is entirely free, when it may be discharged from the table by tipping the trough-section 6. The piercing-point 8 having been replaced, the mandrel may be then advanced by releasing the pressure from one end of the cylinder and applying pressure at the other end sufficient to reverse the rod and pulling-wheels. The outer end of the mandrel again enters between the supporting-jaws and advances to proper position with relation to the disks, when the operation may be again repeated.

The advantages of the centering device will be manifest from the foregoing description, and it provides a positive, accurate, simple, and readily-adjusted means for the purposes in view. It may be set upon the table at any desired position by changing its location forward or back in the slideways 4 and provides a valuable addition to tables of this class for the purpose of forming seamless tubing. If desired, the upper jaw in some cases may be dispensed with, the mandrel merely resting on the lower jaw, so that it is not confined in case of "whipping."

As thus constructed the whole apparatus is simple, compact, and efficient, the operation is rendered easy and dispenses with manual labor very largely, while rendering the manipulation of the mandrel and tube comparatively easy, insuring the positive alinement and adjustment of the various parts independent of any especial skill. The advantages of this construction will be appreciated by all those familiar with the operation of making seamless tubes, and the mechanism may be adapted to the manufacture of various sizes of tubes, as desired.

Variations, changes, and modifications may be made by the skilled mechanic in the design, proportions, or other details, according to especial conditions, without departing from the invention, since we do not desire to be limited to the exact construction shown and described, but to include all such as within the scope of the following claims.

What we claim is—

1. The combination with the table of a tube-mill having longitudinal ways or grooves on its inner sides, and a mandrel movably carried on the table; of a centering device for the mandrel consisting of a vertical frame adjustably mounted upon said table, and having lugs or projections for engaging said ways whereby the same may be adjusted lengthwise of said table.

2. The combination with the table of a tube-mill having longitudinal ways or grooves on its inner sides, of a thrust-bearing consisting of a frame adjustably mounted on said table and having lugs or projections for engaging said ways whereby the same may be adjusted lengthwise of said table, a mandrel flexibly connected with said thrust-bearing, and means for moving the thrust-bearing and mandrel along the table, substantially as set forth.

3. The combination with the table of a tube-mill having longitudinal ways or grooves on its inner sides, of a thrust-bearing consisting of a frame adjustably mounted on said table and having lugs or projections for engaging said ways, whereby the same may be adjusted lengthwise of said table; a mandrel flexibly connected with said thrust-bearing, means for locking the thrust-bearing in position upon the table, and means for moving the thrust-bearing and mandrel along the table, substantially as set forth.

4. The combination with the table of a tube-mill having longitudinal ways or grooves on its inner sides, of a thrust-bearing consisting of a frame adjustably mounted on said table and having lugs or projections for engaging said ways whereby the same may be adjusted lengthwise of said table; a mandrel flexibly connected with said thrust-bearing, means for moving the thrust-bearing and mandrel along the table, and a centering device for the mandrel consisting of a vertical frame adjustably mounted upon the table, and having lugs or projections for engaging said ways whereby it may be adjusted lengthwise of the table, substantially as set forth.

5. The combination with the table of a tube-mill having longitudinal ways or grooves on its inner sides; of a sliding trough-support adjustably mounted upon said table having lugs or projections for engaging said ways, and a tipping section of trough pivotally mounted upon said trough-support, adapted to receive the finished tube and to discharge it at one side of the table, by tipping the trough, substantially as set forth.

In testimony whereof we affix our signatures in presence of two witnesses.

JOHN H. KING.
EDWARD M. WOLFE.

Witnesses:
SUSIE W. ROWZER,
WILLIAM DICKS.